United States Patent [19]
Heibel

[11] Patent Number: 5,490,184
[45] Date of Patent: Feb. 6, 1996

[54] METHOD AND A SYSTEM FOR ACCURATELY CALCULATING PWR POWER FROM EXCORE DETECTOR CURRENTS CORRECTED FOR CHANGES IN 3-D POWER DISTRIBUTION AND COOLANT DENSITY

[75] Inventor: Michael D. Heibel, Penn Township, Pa.

[73] Assignee: Westinghouse Electric Corporation, Pittsburgh, Pa.

[21] Appl. No.: 278,290

[22] Filed: Jul. 21, 1994

[51] Int. Cl.$^6$ .................................................. G21C 17/00
[52] U.S. Cl. .......................... 376/254; 376/247; 376/246; 376/258; 376/216
[58] Field of Search ..................... 376/254, 255, 376/247, 246, 258, 241, 216; 916/DIG. 238, DIG. 239; 222/54; 374/30, 112, 127, 174

[56] References Cited

U.S. PATENT DOCUMENTS

| | | | |
|---|---|---|---|
| 3,219,939 | 11/1965 | Vincent | 376/254 |
| 4,330,367 | 5/1982 | Musick | 376/245 |
| 4,333,797 | 6/1982 | Nishizawa | 376/210 |
| 4,637,910 | 1/1987 | Impink, Jr. | 376/216 |
| 4,642,213 | 2/1987 | Impink, Jr. | 376/218 |
| 4,711,753 | 12/1987 | Impink, Jr. | 376/216 |
| 4,774,049 | 9/1988 | Impink, Jr. et al. | 376/245 |
| 4,774,050 | 9/1988 | Impink, Jr. | 376/245 |
| 4,839,134 | 6/1989 | Impink, Jr. et al. | 376/216 |
| 4,944,035 | 7/1990 | Aagardl | 364/556 |
| 5,024,801 | 6/1991 | Impink, Jr. et al. | 376/217 |
| 5,158,738 | 10/1992 | Trouble et al. | 376/217 |

*Primary Examiner*—Donald P. Walsh
*Assistant Examiner*—Meena Chelliah

[57] ABSTRACT

Excore detector measurements are used to generate on-line absolute reactor power in a pressurized water reactor (PWR) by calibrating detector current measurements to the reactor thermal power calculation made at a base time early in reactor cycle while the thermal reactor power measurement is still accurate. Measurements are also made at the base time of the three-dimensional core power distribution and the core inlet temperature. Present core power measurements are then made by measuring the present excore detector current, the most recent three-dimensional core power distribution and the present core inlet temperature. The present core power is then calculated as the ratio of the present detector current to the detector current at the base time multiplied by the reactor thermal power measurement at the base time. The product is then corrected for changes in three-dimensional power distribution as a function of the difference between the three-dimensional core power distribution at the base time and a most recent three-dimensional core power distribution. The product is also corrected for changes in core inlet temperature by a correction factor which is an exponential term in which the difference between the present core inlet temperature and the core inlet temperature at the base time is multiplied by a constant. This constant is empirically determined at two different temperatures, preferably during start-up.

13 Claims, 5 Drawing Sheets

|    | R | P | N | M | L | K | J | H | G | F | E | D | C | B | A |
|----|---|---|---|---|---|---|---|---|---|---|---|---|---|---|---|
| 01 | - | - | - | - | 8.591 | 0.780 | 0.069 | - | 0.069 | 0.780 | 8.591 | - | - | - | - |
| 02 | - | 100.000 | 19.728 | 3.440 | 0.474 | 0.057 | - | - | - | 0.057 | 0.474 | 3.440 | 19.728 | 100.000 | - |
| 03 | 100.000 | 54.522 | 3.440 | 0.474 | 0.057 | - | - | - | - | - | 0.057 | 0.474 | 3.440 | 54.522 | 100.000 |
| 04 | 19.728 | 3.440 | 1.246 | 0.090 | 0.012 | - | - | - | - | - | 0.012 | 0.090 | 1.246 | 3.440 | 19.728 |
| 05 | 8.591 | 2.245 | 0.474 | 0.090 | 0.033 | - | - | - | - | - | 0.033 | 0.090 | 0.474 | 2.245 | 8.591 |
| 06 | 0.780 | 0.235 | 0.057 | 0.012 | - | - | - | - | - | - | - | 0.012 | 0.057 | 0.235 | 0.780 |
| 07 | 0.059 | 0.024 | - | - | - | - | - | - | - | - | - | - | - | 0.024 | 0.059 |
| 08 | - | - | - | - | - | - | - | - | - | - | - | - | - | - | - |
| 09 | 0.069 | 0.024 | - | - | - | - | - | - | - | - | - | - | - | 0.024 | 0.069 |
| 10 | 0.780 | 0.235 | 0.057 | 0.012 | - | - | - | - | - | - | - | 0.012 | 0.057 | 0.235 | 0.780 |
| 11 | 8.591 | 2.245 | 0.474 | 0.090 | 0.033 | - | - | - | - | - | 0.033 | 0.090 | 0.474 | 2.245 | 8.591 |
| 12 | 19.728 | 3.440 | 1.246 | 0.090 | 0.012 | - | - | - | - | - | 0.012 | 0.090 | 1.246 | 3.440 | 19.728 |
| 13 | 100.000 | 54.522 | 3.440 | 0.474 | 0.057 | - | - | - | - | - | 0.057 | 0.474 | 3.440 | 54.522 | 100.000 |
| 14 | - | 100.000 | 19.728 | 3.440 | 0.474 | 0.057 | - | - | - | 0.057 | 0.474 | 3.440 | 19.728 | 100.000 | - |
| 15 | - | - | - | - | 8.591 | 0.780 | 0.069 | - | 0.069 | 0.780 | 8.591 | - | - | - | - |

Reference markers (21) indicate the 100.000 values at (02, P), (02, B), (14, P), and (14, B).

FIG. 3

METHOD AND A SYSTEM FOR ACCURATELY CALCULATING PWR POWER FROM EXCORE DETECTOR CURRENTS CORRECTED FOR CHANGES IN 3-D POWER DISTRIBUTION AND COOLANT DENSITY

BACKGROUND OF THE INVENTION

1. Field of the Invention

This invention is directed to a method and apparatus for determining on-line core wide power output of a pressurized water reactor (PWR) using the excore detector system, and to correction of the same for changes in three-dimensional power distribution in the core and in coolant density.

2. Background of Information

The official determination of the reactor thermal power level in a PWR is based on a heat balance across the steam generators (S/G), called a secondary calorimetric measurement. The results of the calorimetric calculation are used to verify that the reactor is operating within the licensed reactor power level limits, and to calibrate the other indications of reactor power level.

This calorimetric calculation is performed off line. Other indications of reactor power level, such as excore detector signal levels and RCS loop temperature indication values, are periodically calibrated against the calorimetric and used to provide on-line reactor power level inputs to the reactor control and protection systems. Unfortunately, errors in the reactor thermal power level calculation cause errors in all the other indications of reactor power. Presently, there is no easy way to detect and correct small errors in the reactor thermal power calculation.

The major component of the heat balance calculation is the flowrate of feedwater into the S/G. The magnitude of the flowrate is typically determined using flow venturis installed in the main feedwater line for each S/G. The feedwater venturi flow readings are subject to systematic and random error mechanisms, which cause erroneous reactor power level calculation results. The most frequent systemic error, feedwater venturi fouling, causes the calculated reactor power to increase relative to the true reactor power level, necessitating a net reduction in the actual reactor power to maintain the apparent power within the operating limits. The amount of electrical output generated by the plant then decreases, reducing the revenue of the utility.

There is a need, therefore, for an improved method and apparatus for on-line measurement of reactor power which is not affected by random errors in the thermal power measurements.

There is also a need for a method and apparatus for correcting for errors in the calorimetric calculation of reactor power caused by feedwater venturi fouling or other types of systematic calorimetric error sources.

SUMMARY OF THE INVENTION

These needs and others have been satisfied by the invention which is directed to a method and apparatus for on-line determination of PWR power using excore detector signals corrected for changes in three-dimensional power distribution in the reactor core and for changes in coolant density.

It has been found that feedwater venturi fouling is a phenomena that tends to increase with reactor operating time during a fuel cycle. The thermal power calculations performed early in the cycle tend to be relatively unaffected by venturi fouling effects, and therefore, tend to be quite accurate, allowing the power calibrations of the dependent power indications to be correspondingly accurate. In order to maintain the accuracy of the power calibration developed for the excore detectors in the absence of an accurate thermal power measurement, it is necessary to be able to normalize out the changes in the excore detector signals caused by changes in the core radial and axial power distribution that have occurred since the last accurate thermal power measurement was performed. It is also necessary to correct for the effects on indicated power caused by changes in coolant density that occur when reactor inlet temperature changes. This invention is directed to a method and system capable of allowing the signals from the excore detectors to be used as an independent means of determining the reactor power in an absolute fashion. In fact, the power measurements generated from the excore detectors in accordance with the invention can be used to ascertain the accuracy of and, if necessary, correct the thermal power measurements.

In accordance with the present invention, excore detector current measurements are used to generate absolute reactor power by calibrating detector current measurements to the reactor thermal power calculation made at a base time early in the reactor cycle while the thermal reactor power measurement is still accurate. Measurements are also made at the base time of the three-dimensional core power distribution and the core inlet temperature distribution. Present core power measurements are then made by measuring the present excore detector current, the most recent three-dimensional core power distribution and the present core inlet temperature. The present core power is then calculated as the ratio of the present detector current to the detector current at the base time multiplied by the reactor thermal power measurement at the base time. The product is then corrected for changes in three-dimensional power distribution and in core inlet temperature since the measurement of those parameters at the base time. As the typical PWR excore detector system includes a plurality of excore detectors, usually four equally spaced around the reactor vessel, and each includes a top detector section and a bottom detector section, present core power determinations are made for each of the detector sections of each detector with the results averaged to determine present core power.

The three-dimensional power distribution can be measured by an incore detector system which may utilize either fixed incore detectors or a moveable incore detector system. In the former case, a three dimensional core power distribution can be continually measured repetitively such as for instance every minute. The three-dimensional power distribution can also be generated by the system described in U.S. Pat. No. 4,774,049 which utilizes inlet temperature and readings from a pattern of thermocouples which measure core exit temperature to calculate on an on-line basis the three-dimensional core power distribution.

The invention provides a simplified means for correcting the excore measurement for changes in coolant density. The correction factor is an exponential term in which the difference between the present core inlet temperature and core inlet temperature at the base time is multiplied by a constant. This constant is empirically determined at two different temperatures, preferably during reactor start-up.

With the invention, only a single measurement of the thermal reactor power is required. A single calculation is made at a base time when the feedwater venturi used to measure the feedwater flow for the calorimetric calculation is unobstructed and the thermal reactor power calculation is accurate. The invention embraces both the method and apparatus for absolute excore detector reactor power determination.

BRIEF DESCRIPTION OF THE DRAWINGS

A full understanding of the invention can be gained from the following description of the preferred embodiments when read in conjunction with the accompanying drawings in which:

FIG. 3 is a plot of relative assembly power weighting factors used to develop the correlations shown in FIG. 2.

DESCRIPTION OF THE PREFERRED EMBODIMENT

Figure 1:
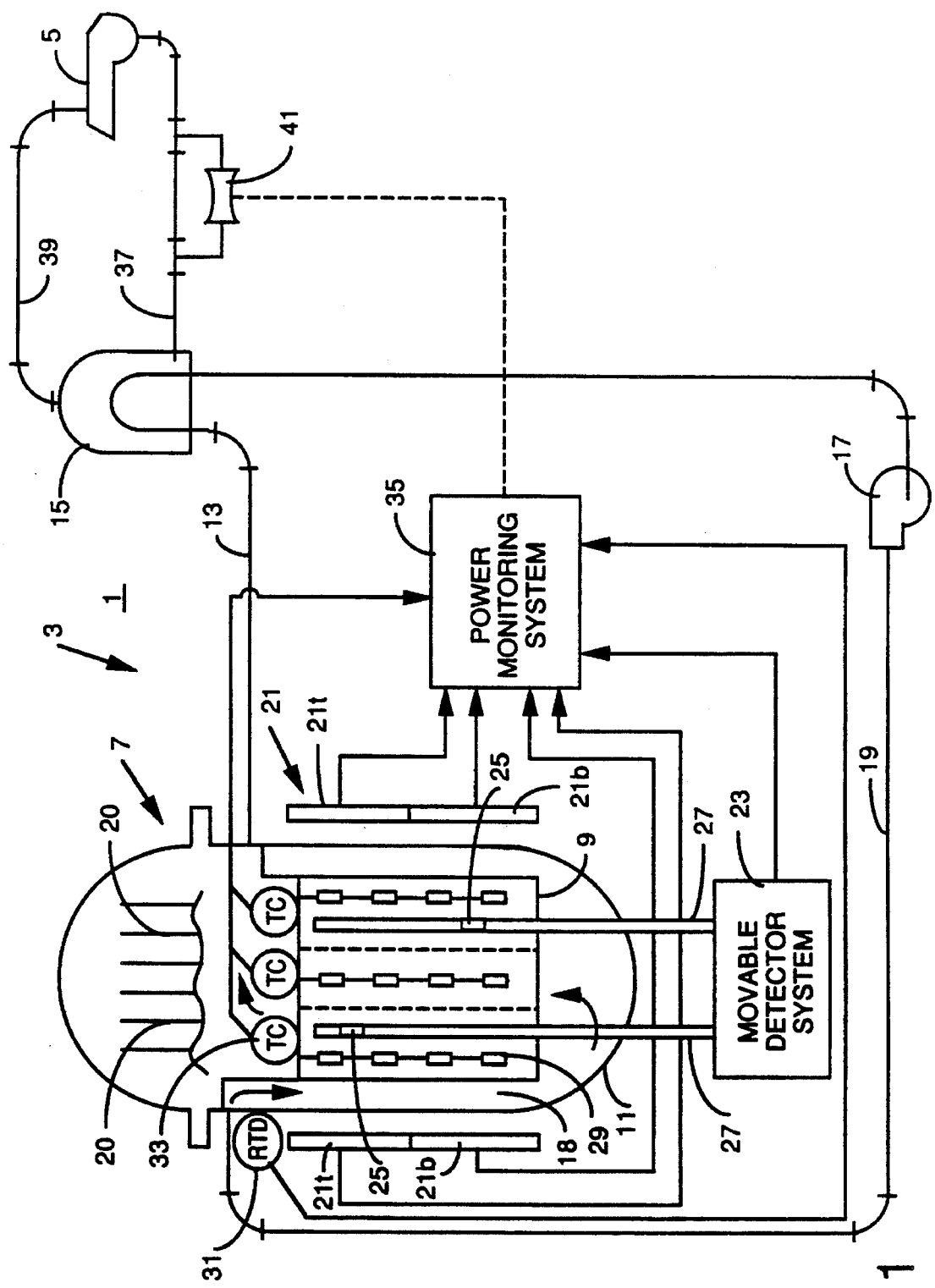
FIG. 1 is a schematic diagram of a PWR incorporating the invention.

FIG. 1 illustrates a nuclear electric power generating plant 1 in which a nuclear steam supply system (NSSS) 3 supplies steam for driving a turbine-generator 5 to produce electric power. The NSSS 3 has a pressurized water reactor (PWR) 7 which includes a reactor core 9 housed within a reactor vessel 11. Fission reactions within the core 9 generate heat which is absorbed by a reactor coolant, light water, which is passed through the core. The heated coolant is circulated through a hot leg 13 to a steam generator 15. Reactor coolant is returned to the reactor 3 from the steam generator by a reactor coolant pump (RCP) 17 through a cold leg 19. Typically, a PWR has at least 2 and often 3 or 4 steam generators 15 each supplied with heated coolant through a hot leg 13 forming with a cold leg and an RCP 17 a primary loop, and each supplying steam to the turbine-generator 5. For clarity, only one loop has been shown.

Coolant returned to the reactor flows downward through an annular downcormer 18 and then upward through the core 9 in the direction indicated by the arrows in FIG. 1. The reactivity of the core 9, and therefore the power output of the reactor, is controlled on a short term basis by control rods 20 which may be selectively inserted into the core 9. Long term reactivity is regulated through control of the concentration of a neutron moderator such as boron dissolved in the coolant. Regulation of the boron concentration affects reactivity uniformly throughout the core as the coolant circulates through the entire core. On the other hand, the control rods 20 affect local reactivity and therefore, result in an asymmetry of axial and radial power distribution within the core 9.

Conditions within the core 9 are monitored by several different sensor systems. These include the excore detector system 21 which measures neutron flux escaping from the reactor vessel. The excore system 21 includes source range detectors (not shown) used when the reactor is shut-down, intermediate range detectors (also not shown) used during start-up and shut-down, and power range detectors used when the reactor is above about 5% power. The power range excore detectors comprise top and bottom equal length un-compensated ion chambers $21_t$ and $21_b$ stacked on top of each other to form a power range excore detector channel. There are four power range detector channels (only 2 shown in FIG. 1) symmetrically located, radially and axially, just outside the reactor vessel 11.

Older PWR's are equipped with a moveable incore detector system 23. This system includes moveable detectors 25 which are inserted into the reactor core through tubes 27. These moveable detectors 25 are used by the system 23 to map the axial and radial power distribution in the core 9.

Newer PWR's are provided with strings of fixed incore detectors 29 in place of, or in some instances in addition, to the moveable incore detector system 23. The moveable incore detector system 23 is used only periodically, such as once a month. On the other hand, the fixed incore detectors permit continual mapping of the axial and radial power distribution within the core such as, for instance, every few minutes.

Instrumentation relevant to the present invention also includes resistance temperature detectors (RTDs) 31 which measure the core inlet temperature. RTDs 31 are provided for each of the loops of a multi-loop system. An array of core exit thermocouples (TCs) 33 are distributed across the top of the reactor core to measure core exit temperatures. These core exit temperatures can be utilized by a system such as that described in U.S. Pat. No. 4,774,050 which is hereby incorporated by reference as another means for determining core axial and radial power distribution.

The currents measured by the detectors $21_t$ and $21_b$ of each of the channels of the power range excore detectors system 21, the inlet temperature measured by the RTDs 31 and the output of the moveable detector system 23 and the core exit temperatures measured by the thermocouples 33 are all provided to the power monitoring system 35 which provides an absolute measurement of core power in a manner to be discussed below. The core power signal generated by the system 35 can be used in a known manner in the reactor control and protection systems.

Reactor coolant heated as it passes through the reactor core 9 is delivered through the hot leg 13 to the steam generator 15 where it converts feed water delivered through the feedwater system 37 into steam which is delivered through the steam line 39 to the turbine generator 5. The flow of feedwater to the steam generator 15 is measured by a venturi 41.

As mentioned above, the power which can be generated by the PWR 7 for licensing purposes is determined by a calorimetric measurement calculated from parameters including feedwater flow measured by the venturi 41. It is fouling of this venturi 41 over time which creates the error in the thermal power calculations referred to above.

In accordance with the present invention, only a thermal power measurement taken at a base time when the venturi 41 is not fouled, or at some other time when the thermal power is known to be accurate, is used to calibrate the power range excore detector power measurement. As indicated above, the reactor power determined from the Power Range excore detectors $21_t$ and $21_b$ is subject to power indication deviations caused by relative changes in the core axial and radial power distribution, in addition to the changes caused by variations in the absolute core power output. The indicated power from the Power Range channels is also subject to errors caused by changes in the density of the water in the vessel downcomer region 18 and fuel that occur when the vessel inlet temperature changes. In order to utilize the Power Range channels for power indication in an absolute sense, the factors which cause non-power level changes in the excore detector currents must be understood and compensated for in the relationship between excore detector signal level and core power level.

The Power Range excore detector current for the top detector $21_t$ in a Power Range channel ($I_t$) for a core of height H may be expressed:

$$I_t = A_t \exp-(\Sigma_R d_t) \int_0^H w_t(z) P_r P_{wa}(Z) dz \qquad \text{Eq. (1)}$$

where:

$A_t$=a parameter proportional to the top detector sensitivity and detector/core geometry;

$\Sigma_R$=the effective macroscopic removal fast neutron cross section of the material between the core and the detector;

$d_t$=the effective distance between the top excore detector and the assemblies contributing to the signal measured by the detector;

$w_t(z)$=an axial weighting factor for the top detector which describes the relative contribution of neutrons produced at core axial location z, in the vicinity of the excore detector, to the total signal measured by the detector;

$P_r$=the core relative power level, in terms of fraction of full power, and;

$P_{wa}(z)$=the radially weighted core relative power distribution at core elevation z. Equal to the sum of products of relative assembly powers and the corresponding radially varying weighting factors.

Figure 2:
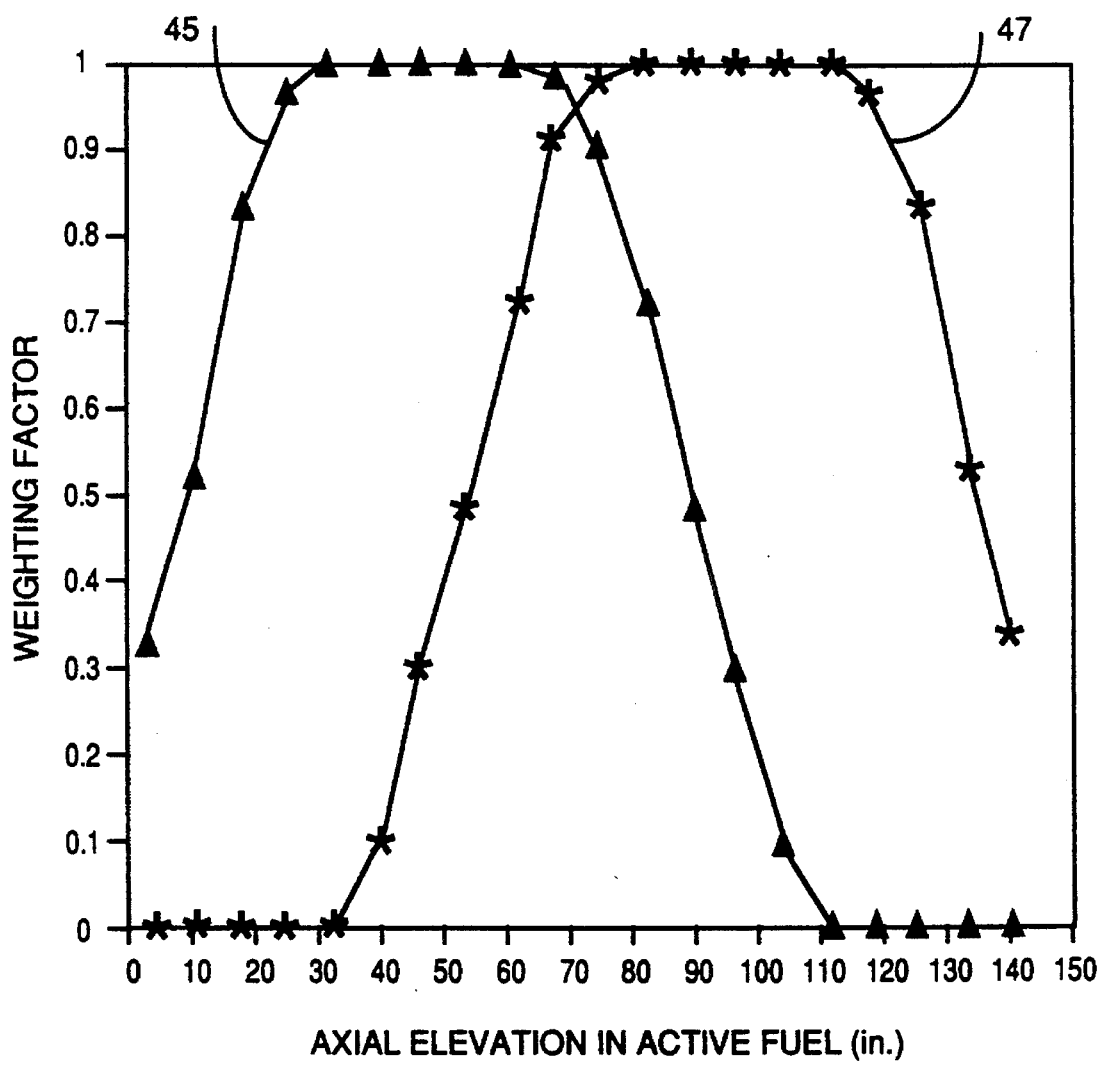
FIG. 2 is a plot of total detector current versus weighted assembly power for a PWR shown in FIG. 1.

A $w_t(z)$ function needs to be developed for each PWR application of this methodology. The axial power weighting factor may even be unique to each detector in every excore detector channel. This function is developed utilizing shielding type neutron transport codes as known in the art, and once established should not change unless the physical characteristics of the detector, or the detector/core geometry, are changed. An example of this type of function is shown in FIG. 2, where the curves 45 and 47 represent the top and bottom detector weighting factors respectively.

The radial relative assembly power weighting factors used to develop the value of $P_{wa}(z)$ are not a function of axial core position. They are developed for each type of plant (e.g., 2 loop, 3 loop, 4 loop), using methods similar to the axial weighting factor determination methods. An example of the radial weighting factors used for a 4 loop plant is provided to FIG. 3.

Equation 1 describes what excore detector current would be observed at a combination of reactor axial and radial power distribution conditions, and core power level, with explicit consideration given to changes in the environment between the fast neutron sources in the core and the detector. The ability to determine the influences of these factors on the excore detector currents allows the excore detectors to be used in an absolute fashion to determine reactor power level. The complexity of determining the value of $A_t$ and $\Sigma_R$ makes Equation 1 of little practical benefit. However, the form and fashion of Equation 1 does allow for the fairly straightforward determination of changes in the excore detector currents from a reference set of conditions. The reference conditions may be expressed in an equation of the form:

$$I_t^R = A_t^R \exp-(\Sigma_R^R d_t) \int_o^H w_t(z) P_r^R P_{Wa}^R(z) dz \qquad \text{Eq. (2)}$$

where the superscript R denotes the reference condition value of the parameters defined for Equation 1. The determination of changes in the excore detector currents due to core power distribution and detector/core environmental condition changes from a reference condition allows the actor power level to be determined accurately from the excore detector currents.

For ease of notation, define the integral portions of Equations 1 and 2 to be the following:

$$\int_o^H w_t(z) P_r P_{wa}(z) dz = P_r Q_{wa} \qquad \text{Eq. (3)}$$

and;

$$\int_o^H w_t(z) P_r^R P_{wa}^R(z) dz = P_r^R Q_{wa}^R \qquad \text{Eq. (4)}$$

where the superscript R denotes the reference value.

The ratio of the measured top detector current to the detector current measured at the reference condition may be expressed:

$$\frac{I_t}{I_t^R} = \left[\frac{A_t}{A_t^R}\right]\left[\frac{P_r}{P_r^R}\right]\left[\frac{Q_{wa}}{Q_{wa}^R}\right] \exp((\Sigma_R^R - \Sigma_R)d_t) \qquad \text{Eq. (5)}$$

The value $A_t$ should be the same as the reference value of $A_t$, unless the detector/core geometry changes or the detector sensitivity changes in the time interval between the reference and current measurements. Therefore, the A coefficients will cancel in Equation 5, and the actual core power level may be expressed:

$$P_r = P_r^R \left[\frac{I_t}{I_t^R}\right]\left[\frac{Q_{wa}^R}{Q_{wa}}\right] \exp-((\Sigma_R^R - \Sigma_R)d_t) \qquad \text{Eq. (6)}$$

Equation 6 may be solved directly utilizing measured conditions for all the parameters except the $\Sigma_R$'s and $d_t$. The values of the reference and current $\Sigma_R$ values will have a temperature dependence not expressed in Equation 6. In order to account for the temperature dependence of the $\Sigma_R$ values, a simple temperature dependent expression for $\Sigma_R^R$, relative to the reference $\Sigma_R$, may be developed.

The value of $\Sigma_R$ which exists following a deviation in the core downcomer and fuel region water temperature from the reference condition, assuming a linear variation in $\Sigma_R$ with temperature over the range of applicability, may be expressed:

$$\Sigma_R = \Sigma_R^R + \frac{\partial \Sigma_R}{\partial T_i}(T_i^R - T_i) \qquad \text{Eq. (7)}$$

where:

$T_i$= the vessel inlet temperature measured by the RTD 33 in the vessel inlet located nearest the encore detector channel, and;

$T_i^R$=the value of $T_i$ present when the reference conditions are measured.

Substituting this expression for $\Sigma_R$ into Equation 6 yields:

$$P_r = P_r^R \left[\frac{I_t}{I_t^R}\right]\left[\frac{Q_{wa}^R}{Q_{wa}}\right] \exp\left(\frac{\partial \Sigma_R}{\partial T_i}(T_i^R - T_i)d_t\right) \qquad \text{Eq. (8)}$$

Equation 8 contains the temperature correction necessary to compensate the excore detector indicated power for downcomer and fuel region temperature variations, but can not be solved until the partial differential term and effective distance term in the exponential portion of the equation are known.

It is not necessary to determine the partial differential and effective distance terms in Equation 8 separately or analytically in order to properly utilize the equation to determine an accurate compensated excore detector power. Determining the product of these terms will suffice. Solving Equation 8 for the product in the exponent yields:

$$d_t \frac{\partial \Sigma_R}{\partial T_i} = \frac{1}{(T_i^R - T_i)} \ln\left[\left(\frac{I_t^R}{I_t}\right)\left(\frac{P_r Q_{wa}}{P_r^R Q_{wa}^R}\right)\right] = K_t \quad \text{Eq. (9)}$$

The value of $K_t$ can be determined from measurements at two different temperatures and power levels during actor start-up testing, and should remain essentially constant from one cycle to the next. A typical value in a four loop plant for $K_t$ is 0.012/°F. Utilizing the definition of $K_t$ in Equation 9, Equation 8 becomes:

$$P_r = P_r^R \left[\frac{I_t}{I_t^R}\right]\left[\frac{Q_{wa}^R}{Q_{wa}}\right] \exp(K_t(T_i^R - T_i)) \quad \text{Eq. (10)}$$

An expression of the form of Equation 10 may be developed for both the top and bottom detector in each encore detector channel. The subscript "t" is replaced with the subscript "b" in Equation 10 for the bottom detector in the channel. Separate axial power weighting factors are needed for the bottom section detectors. The average of all the excore detector compensated relative power values is the most accurate indication of core power, relative to the reference condition accuracy, available from the excore detectors.

Figure 4:
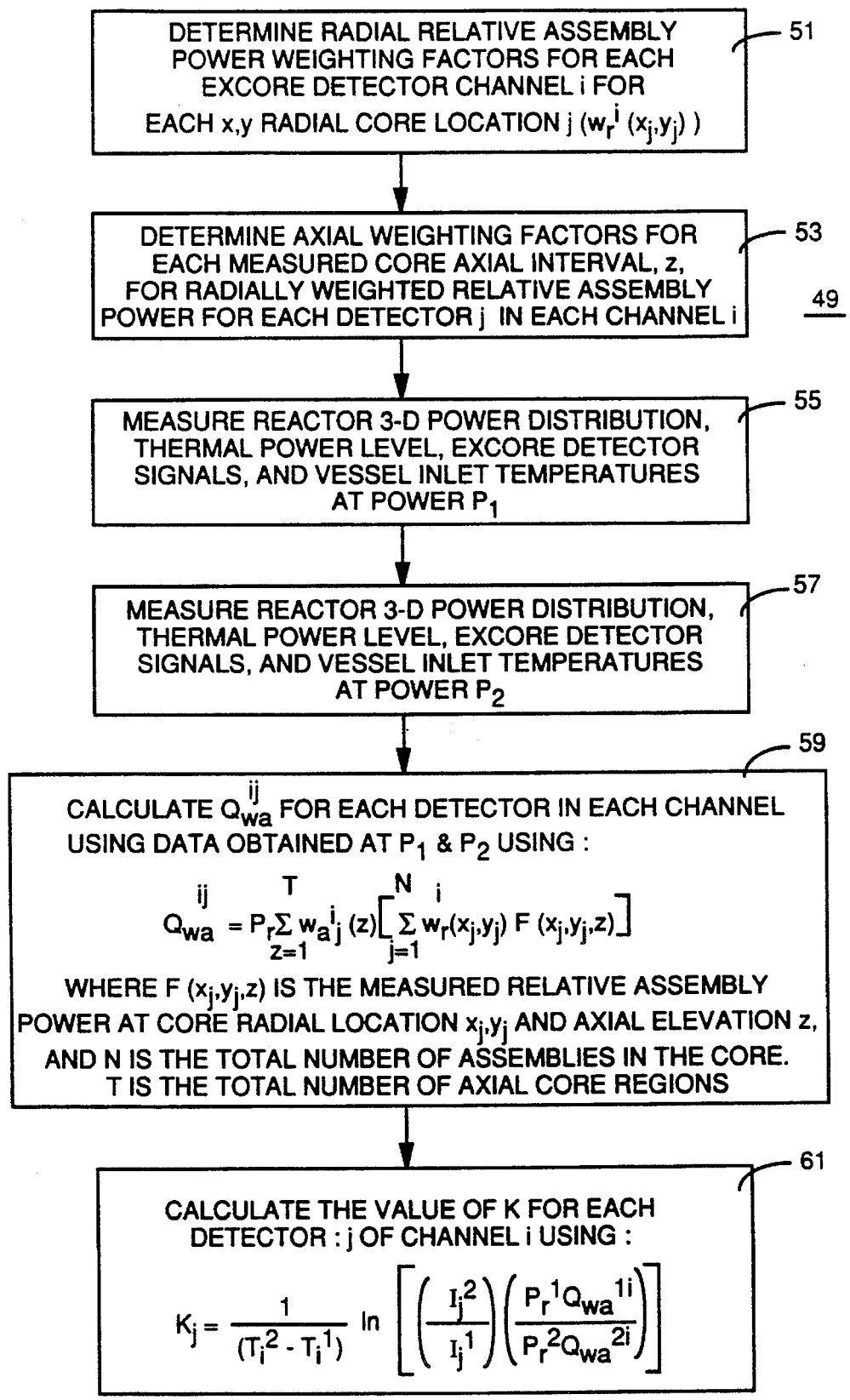
FIGS. 4 and 5 are flow charts of programs used by the power monitoring system to monitor the power generated by the PWR.

FIG. 4 is a flow chart for a program 49 for determining the constant K used to make adjustments for changes in temperature. A value for K is calculated for each detector. As shown at 51, the first step is to determine the radial relative assembly power weighting factors for each detector channel i for each x, y radial core location j as shown for instance in FIG. 3. The axial weighting factors for each measured core axial interval, z, for radially weighted relative assembly power for each detector j and each channel i is then determined at 53 using for instance the weighting factors illustrated in FIG. 2. Next the measured reactor three-dimensional power distribution, thermal power level, excore detector signals, and vessel inlet temperatures at the two different power settings $P_1$ and $P_2$ are determined at 55 and 57. Then, at 59, $Q_{wa}$ is calculated for each channel i at the power levels $P_1$ and $P_2$. Finally, the constant K is calculated for each detector j at 61.

Figure 5:
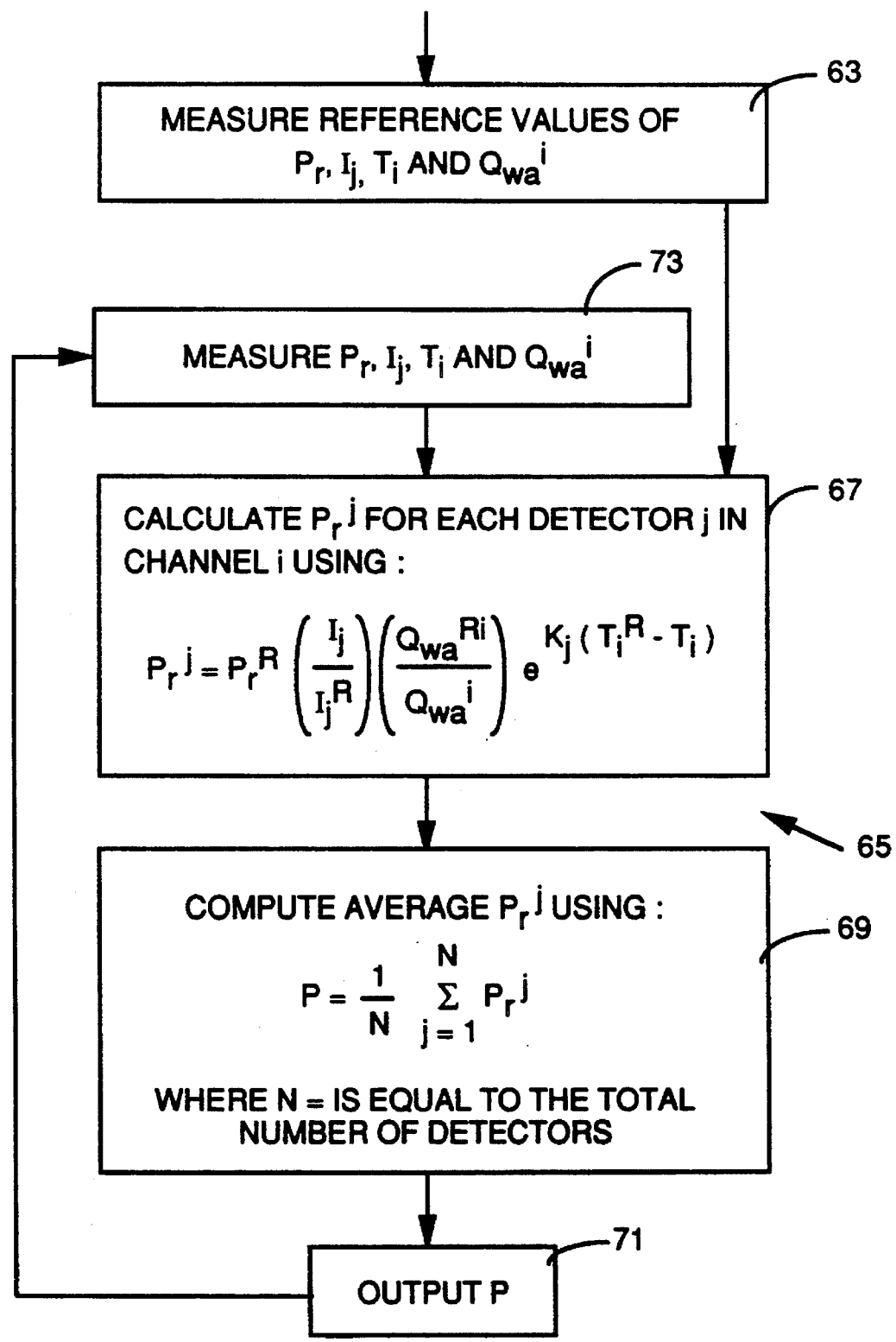

FIG. 5 is a flow chart for a program 63 which can be used by a computer in the core monitoring system 35 for determining the current power output P from the excore detector currents. The reference values of the core power using the calorimetric measurement, each of the detector currents, and the inlet temperature for each channel are determined at 65 and used to determine $Q_{wa}$ for each channel. The program then enters a loop 65 in which the current power is determined from the excore detectors periodically. This includes calculation of the relative power for each detector current calculated at 67. The average power is then determined at 69 and output as the excore detector power determination at 71 for each new determination of power.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed:

1. A method for determining the power output of a pressurized water reactor having an excore detector system, said method comprising the steps of:

determining at a base time thermal power output of said reactor;

measuring detector current in said excore detector system including measuring detector current at said base time;

measuring core inlet temperature including measuring core inlet temperature at said base time;

periodically measuring core three-dimensional power distribution in said reactor including measuring core three-dimensional power distribution in said reactor at said base time; and determining present core power as the ratio of present detector current to detector current at said base time multiplied by said thermal power at said base time and corrected as a function of changes in said core inlet temperature and in said core three-dimensional power distribution since said base time.

2. The method of claim 1 wherein said present core power is corrected as a function of a difference between said core inlet temperature at said base time and present core inlet temperature, and as a function of a difference between said three-dimensional core power distribution at said base time and a most recent three-dimensional core power distribution.

3. The method of claim 2 wherein said step of correcting said present core power as a function of changes in core inlet temperature comprises calculating a constant from core power determined at two different core inlet temperatures and then subsequently correcting core power by an exponential term in which said constant is multiplied by a difference in core inlet temperature at said base time and present core inlet temperature.

4. The method of claim 3 wherein said present core power is determined from the relationship:

$$P_r = P_r^R \left[\frac{I}{I^R}\right]\left[\frac{Q_{wa}^R}{Q_{wa}}\right] \exp[K(T_i^R - T_i)]$$

wherein:

$P_r$ = present relative core power;

$P_r^R$ = relative core power at said base time which is said thermal power determined at said base time;

$I$ = present detector current;

$I^R$ = detector current at said base time;

$Q_{wa}^R$ = weighted average core three-dimensional power distribution at said base time;

$Q_{wa}$ = most recent weighted average core three-dimensional power distribution;

$T_i^R$ = core inlet temperature at said base time;

$T_i$ = present core inlet temperature; and

K = a constant determined from the following relationship:

$$K = \frac{1}{T_i^R - T_i} \ln\left[\left(\frac{I^R}{I}\right)\left(\frac{P_R Q_{wa}}{P_r^R Q_{wa}^R}\right)\right]$$

wherein K is calculated from measurements taken at two different core inlet temperatures.

5. The method of claim 1 wherein said step of measuring said three-dimensional core power distribution comprises utilizing an incore power measurement system to measure said three-dimensional core power distribution.

6. The method of claim 1 wherein said step of measuring said three-dimensional core power distribution comprises measuring core exit temperatures across said reactor and using said core exit temperatures, core inlet temperatures, and excore detector currents to determine said three-dimensional core power distribution.

7. The method of claim 1 wherein said excore detector system includes at least one excore detector having a top detector measuring a top detector current and a bottom detector measuring a bottom detector current and wherein present core power is determined as an average between a top detector core power measurement made using said top detector current and a bottom detector core power measurement made using said bottom detector current.

8. The method of claim 7 wherein said detector system comprises a plurality of excore detectors each having a top detector and a bottom detector and wherein said present core power is determined as an average of said detector top core power measurement and said bottom core power measurement for all of said plurality of excore detectors.

9. A system for determining the power output of a pressurized water reactor system having a reactor with a reactor core with a core inlet through which reactor coolant enters for circulation through said reactor core, a steam generator through which reactor coolant circulated through said reactor core passes before it returns to said core inlet and feedwater means supplying feedwater to said steam generator and providing a feedwater flow measurement from which thermal power generated by said reactor is calculated; said monitoring system comprising:

excore detector means adjacent said reactor for generating a detector current responsive to neutron flux produced by said reactor core;

means for measuring core inlet temperature;

means for determining core three-dimensional power distribution in said reactor core; and means determining present core power as the ratio of present detector current to detector current at a base time multiplied by thermal power calculated at said base time and corrected as a function of present core inlet temperature and core inlet temperature at said base time measured by said means for measuring core inlet temperatures and as a function of a most recent measurement of core three-dimensional power distribution in said reactor core and core three-dimensional power distribution at said base time measured by said means for measuring core three-dimensional power distribution.

10. The system of claim 9 wherein said excore detector means comprises plural excore detector means each generating a detector current and wherein said means determining present core power calculates present core power as an average of present core power determined from each of said detector currents.

11. The system of claim 10 wherein plural excore detector means comprises multiple detectors each having a top detector section generating a top detector current and a bottom detector section generating a bottom detector current and wherein said means determining present core power calculates present core power as an average of present core power determined from each of said top detector currents and bottom detector currents.

12. The system of claim 10 wherein said means determining present core power calculates said average of present core power from present core power determined for each detector means according to the relationship:

$$P_r = P_r^R \left[ \frac{I}{I^R} \right] \left[ \frac{Q_{wa}^R}{Q_{wa}} \right] \exp[K(T_i^R - T_i)]$$

wherein:

$P_r$=present relative core power;

$P_r^R$=relative core power at said base time which is said thermal power determined at said base time;

$I$=present detector current;

$I^R$=detector current at said base time;

$Q_{wa}^R$=weighted average core three-dimensional power distribution at said base time;

$Q_{wa}$=most recent weighted average core three-dimensional power distribution;

$T_i^R$=core inlet temperature at said base time;

$T_i$=present core inlet temperature; and $K$=a constant determined from the following relationship:

$$K = \frac{1}{T_i^R - T_i} \ln\left[ \left( \frac{I^R}{I} \right) \left( \frac{P_R Q_{wa}}{P_r^R Q_{wa}^R} \right) \right]$$

wherein K is calculated from measurements taken at two different core inlet temperatures.

13. The method of claim 1 wherein said present pressurized water reactor core power is determined on-line.

* * * * *